United States Patent Office 3,520,779
Patented July 14, 1970

3,520,779
SYNTHESIS OF STEROIDS
Seymour D. Levine, North Brunswick, and Saul L. Neidleman, Lawrence Township, N.J., assignors to E. R. Squibb & Sons, Inc., New York, N.Y., a corporation of Delaware
No Drawing. Filed May 22, 1967, Ser. No. 640,373
Int. Cl. C07c 167/00
U.S. Cl. 195—51                                    4 Claims

ABSTRACT OF THE DISCLOSURE

This invention relates to a new process for preparing α-halo-keto steroids. These steroids are prepared by interacting the corresponding α-(hydroxymethylene)-keto steroid, or an ether or ester thereof, with a halogenating agent. The halo-keto steroids formed are useful as anabolic agents if of the androstane series, progestational agents if of the 11-unsubstituted pregnane series, and anti-inflammatory agents if of the 11 oxygenated pregnane series. The compounds of this invention are also useful as emulsifying agents.

---

This invention relates to a new process for synthesizing steroids and to certain new steroids formed thereby.

In its broadest aspects, the new process of this invention entails interacting an α-(hydroxymethylene)-keto steroid, or an ether or ester thereof, with a halogenating agent, whereby the corresponding α-halo-keto steroid is formed. This process can be depicted generally by the formula:

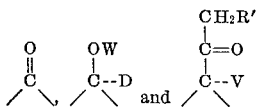

wherein R is hydrogen, alkyl, aralkyl, or acyl, S is a steroid residue, and X is halogen (preferably chlorine and bromine).

Any steroid containing a hydroxymethylene group (or ether or ester thereof) on a carbon adjacent to a carbon having a keto substituent can be used as a starting material in the process of this invention. Among such steroids can be mentioned the 2-hydroxymethylene derivatives (or ethers or esters thereof) of 3-keto steroids or 1-keto steroids, the 3-hydroxymethylene derivatives (or ethers or esters thereof) of 2-keto steroids, or 4-keto steroids, the 16-hydroxymethylene derivatives (or ethers or esters thereof) of 17-keto steroids; the 6-hydroxymethylene derivatives (or ethers or esters thereof) or 7-keto steroids; the 7-hydroxymethylene derivatives (or ethers or esters thereof) of 6-keto steroids; 11-hydroxymethylene derivatives (or ethers or esters thereof) of 12-keto steroids; 12-hydroxymethylene derivatives (or ethers or esters thereof of 11-keto steroids; 17-hydroxymethylene derivatives (or ethers or esters thereof) of 16-keto steroids.

Among the compounds suitable as starting reactants of the androstane and pregnane series such as those defined by the Formula I

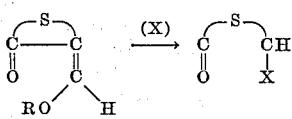

wherein A is hydroxymethylene (or ethers or esters thereof) and B is oxo (O=), and A and B are on adjacent carbons on either of the A, B, C, or D rings, R is selected from the group consisting of hydrogen and methyl; X is an inactive substituent, n is from 0 to 4 and Z is selected from the group consisting of

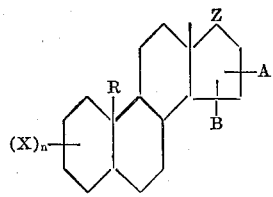

W being a member selected from the group consisting of hydrogen and lower alkanoyl; D being a member selected from the group consisting of hydrogen, lower alkyl, ethinyl, methylethinyl, and halogenoethinyl; V being a member selected from the group consisting of hydrogen, hydroxy, and lower alkanoyloxy; and R' being a member selected from the group consisting of hydrogen, hydroxy, and acyloxy.

By lower alkyl is included hybrocarbons having up to six carbon atoms such as methyl, ethyl, propyl, isopropyl, n-butyl, iso-butyl, tertiary butyl and hexyl.

Illustrative of the acyl groups which may be present at C-21 are inorganic esters such as sulfate and phosphate as well as acid residues of hydrocarbon carboxylic acids having up to twelve carbon atoms including lower alkanoates such as formate, acetate, propionate, n-butylate, iso-butylate, valerate, iso-valerate, caproate (n-hexanoate); aromatic acyl residues such as benzoate and toluate, as well as the acyl portions of dibasic acids such as succinate and phthalate.

Examples of steroids having the structure of Formula I which may be utilized in the practice of the invention are 2-hydroxymethylene-9α-fluoro-11β-hydroxy-testosterone;
2-hydroxymethylene-9α-fluoro-11β-hydroxy-17α-methyl-testosterone;
2-hydroxymethylene-4-chloro-testosterone;
2-hydroxymethylene-7α,17α-dimethyl-testosterone;
2-hydroxymethylene-7α,17α-dimethyltestosterone;
2-hydroxymethylene-17α-ethyl-19-nortestosterone;
2-hydroxymethylene-progesterone-20-ethylene ketal;
2-hydroxymethylene-deoxycorticosterone-20-ethylene ketal;
2-hydroxymethylene-hydrocortisone-20-ethylene ketal;
2-hydroxymethylene-17α,20,20-21-bismethylenedioxy-4-pregnene-3,11-dione;
2-hydroxymethylene-9α-fluoro-11β-hydroxy-16α,17α-isopropylidenedioxy-21-tetrahydropyran-2-yloxy-4-pregnene-3,20-dione;
2-hydroxymethylene-7α-cyano-17α-ethynyl-testosterone;
2-hydroxymethylene-9α-fluoro-11β-hydroxy-17α-methyl-5β-androstan-3-one-17β-ol;
2-hydroxymethylene-9α-fluoro-11β-hydroxy-17α-methyl-5α-androstan-3-one-17β-ol;
2-hydroxymethylene-6-chloro-6-dehydro-17α-acetoxy-progesterone;
2-hydroxymethylene-17α-ethynyl-19-nortestosterone;
2-hydroxymethylene-6α-methyl-17α-acetoxyprogesterone;
2-hydroxymethylene-5β-A-norandrostan-17β-ol-3-one;
2-hydroxymethylene-5α-A-norandrostan-17β-ol-3-one;
2-hydroxymethylene-A-nortestosterone;
2-hydroxymethylene-9α-fluoro-11β-hydroxy-17α-methyl-A-nortestosterone;
2-methoxymethylene-7α-amino-17α-ethynyl-testosterone;
2-acetoxy-methylene-9α-fluoro-11β-hydroxy-17α-methyl-5β-androstan-3-one-17β-ol; and
2-hexoxy-methylene-9α-fluoro-11β-hydroxy-17α-methyl-5β-androstan-3-one-17β-ol.

it is to be further understood that in the 2α-(hydroxymethylene) steroids, those possessing a 5α-hydrogen or a Δ⁴·³-keto configuration will yield a 2α-halo-keto steriod, whereas those having a 5β-hydrogen configuration will yield a 2β-halo steroid.

The starting reactants of the invention may be prepared by reacting the corresponding keto steroid with ethyl formate in the presence of an alkali metal hydride or alkali metal alkoxide base such as sodium hydride, lithium, hydride, sodium methoxide, and so forth, to yield the desired hydroxymethylene starting material.

This reaction may be illustrated by Equation A

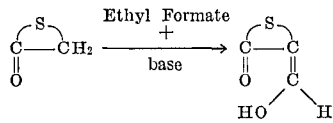

wherein S is as herein defined. It is to be understood that radicals such as alkyl (e.g., ethyl, propyl, hexyl); alkenyl (e.g., ethylene, propylene, etc.); propargyl; methylene; hydroxyl esters (e.g., formate, acetate, propionate, etc.); hydroxyl ethers (e.g., tetrahydropyramyl, trityl, etc.); acetonides; cyano; nitro; amino; halogen; alkoxy (e.g., methoxy, ethoxy, and the like); protected carbonyl (e.g., ketals, thioketals, bismethylenedioxy, cyano-hydrins, etc.); and double bonds may be present in the steroid moiety and not be affected by the reaction conditions.

One process of this invention essentially comprises subjecting the desired hydroxymethylene steroid under aerobic conditions to the action of a halogenating enzyme and a halide salt in the presence of hydrogen peroxide.

As a source of the halogenating enzyme, the microorganism *Caldariomyces fumago* may be used. The microorganism can be grown as a static culture on Czapek-Dox medium at room temperature for five to seven days. The mycelial pads are collected and stored in a deep-freeze for subsequent use. The halogenating enzyme is prepared as a supernatant from an aqueous homogenate of the mycelial pads of the microorganism.

In addition to the halogenating enzyme, hydrogen peroxide must also be present in the reaction mixture. Although hydrogen peroxide itself may be added to the mixture, the hydrogen peroxide may be prepared in situ by use of a peroxide producing enzyme system. Such enzyme systems are well known in the art and include glucose oxidase in the presence of glucose, D- and L-amino acid oxidases in the presence of D- or L-methionine, and diamine oxidase in the presence of histamine. Although substantially any concentration of hydrogen peroxide may be used, preferably the hydrogen peroxide is present in a molar ratio of about 0.1 to 1 to about 100 to 1 (optimally about 1 to 1 to about 10 to 1) based on the weight of the steroid. If a peroxide producing enzyme system is used, the concentration of the enzyme is so adjusted to yield the same concentration of hydrogen peroxide as stated above.

The reaction is preferably conducted at a pH in the range of about 2.2 to about 6 (optimally about 2.2 to about 4 and most advantageously at pH 3.0 in the presence of hydrogen peroxide and about 4 to about 6, most advantageously at pH 5 in the presence of enzymatically produced hydrogen peroxide. To assure that the pH of the reaction mixture is maintained in this range, a buffering agent which buffers in the desired pH range is preferably also added to the reaction medium. Suitable buffers include McIlvaine's buffer, potassium citrate buffer, sodium acetate buffer, potassium phosphate buffer and potassium formate buffer.

The reaction is carried out in an aqueous medium under aerobic conditions, normally at a temperature in the range of about 20° C. to about 30° C. The components of the medium, namely, the steroid, buffering agent, halogenating enzyme, and hydrogen peroxide source are merely mixed with water and the resultant mixture agitated or shaken to assure adequate aeration for about ten to about two hundred minutes (optimally about thirty minutes to about 120 minutes).

Among the utilizable halide salts, the preferred salts are those of alkali metals, such as sodium bromide, potassium bromide, potassium chloride and sodium iodide. The salts are preferably present in excess of the stoichiometric amount required.

Another process of this invention entails the chemical conversion of the same steroids listed hereinbefore to their halo derivatives. This conversion is effected by reacting a desired hydroxymethylene steroid with a source of positive halogen. Although any source can be used, the preferred compounds are the N-haloamides of lower alkanoic acids and the N-haloimides of lower alkanedioic acids. Such compounds include N-bromosuccinimide, N-chloroacetamide, N-bromosuccinimide and N-iodosuccinimide.

The halo steroids of this invention are physiologically active substances that possess progestational activity, if there is no substitution in the C-ring and hence can be used in the treatment of conditions for which progesterone is used, or glucocorticoid activity if there is a hydroxyl or keto group in the 11-position and hence can be used in the treatment of conditions for which hydrocortisone is used. Generally, the compounds prepared in accordance with the invention may be utilized as emulsifying agents.

The following examples illustrate the invention (all temperatures being in centigrade):

EXAMPLE 1

2α-bromo-17β-hydroxy-5α-androstane-3-one (a) To 300 ml. of a *Caldariomyces fumago* ATCC 11925 (American Type Culture Collection, Rockville, Md.) halogenating enzyme solution, prepared by grinding six mycelial pads of the organism with 60 g. of acid-washed sand and 30 ml. distilled water in a Waring blender for two minutes, then centrifuging, are added 60 ml. 0.3% hydrogen peroxide, 300 mg. potassium bromide in 60 ml. water, 120 ml. 0.3 M potassium phosphate buffer (pH 3.0), 300 mg. of 2-hydroxymethylene-17β-hydroxy-5α-androstane-3-one in 24 ml. dimethylsulfoxide, and 36 ml. distilled water. The mixture is distributed in 200 ml. aliquots among three 500 ml. Erlenmeyer flasks and placed on a rotary shaker at 25° C. for thirty minutes. The mixture is then treated with chloroform (120 ml.) and filtered through Hy-flo. The chloroform layer of the filtrate is separated and the aqueous phase extracted with chloroform (3 x 250 ml.) dried over sodium sulfate and evaporated to dryness. The residue is plate chromatographed on neutral alumina using chloroform-hexane (3:2) as the developing solvent, to give a major band at ca. Rf 0.5 which is detectable with iodine vapor. Elution with ethyl acetate, evaporation, and crystallization of the residue from ethyl acetate ether gives 82 mg. of 2α-bromo-17β-hydroxy-5α-androstane-3-one, M.P. 165–166° (D.). Recrystallization from ethylacetate-ether gives the analytical sample having M.P. 167–168° (D.), $[\alpha]_D^{26} + 55°$ (chf.);

$\tau_{CDCl_3}^{TMS}$ 9.24

(s., 18 me.), 8.91 (s., 19 me.), 6.37 (m. 17α-H) and 5.27 (q., J=6.5, 12.8 cps., 2β-H).

*Analysis.*—Calc'd for $C_{19}H_{29}O_2Br$ (369.36) (percent): C, 61.77; H, 7.91; Br, 21.64. Found (percent): C, 61.40; H, 8.00; Br, 21.51.

EXAMPLE 2

Following the procedure in part 1 but substituting 2-methoxymethylene-17β-hydroxy-5α-androstane-3-one for 2-hydroxymethylene-17β-hydroxy-5α-androstane-3-one, there is obtained 2α-bromo-17β-hydroxy-5α-androstane-3-one.

EXAMPLE 3

A solution of 300 mg. of 2-hydroxymethylene-17β-hydroxy-5α-androstane-3-one in 15 ml. of dioxane is treated with 175 mg. of N-bromosuccinimide and 6 ml. of a buffer solution prepared by dissolving 6 g. of sodium acetate and 6.6 ml. of acetic acid in enough water to make a final volume of 100 ml. After twenty minutes at room temperature, water is added and the reaction mixture extracted with chloroform. The chloroform extracts are washed with 8% salt solution, dried over sodium sulfate and evaporated. Chromatography of the residue as described in part (a) and crystallization from ethyl acetate-isopropyl ether gives 2α-bromo-17β-hydroxy-5α-androstane-3-one.

EXAMPLE 4

Following the procedure in Example 3 but substituting 2 - methoxy-methylene-17β-hydroxy-5α-androstane-3-one for 2 - hydroxymethylene-17β-hydroxy-5α-androstane-3-one, there is obtained 2α-bromo-17β-hydroxy-5α-androstane-3-one.

EXAMPLE 5

2α-bromo-17β-hydroxy-androst-4-ene-3-one

Following the procedure in Examples 1, 2 or 3 but substituting 2-hydroxymethylene-testosterone for 2-hydroxy-methylene-17β-hydroxy-5α-androstane-3-one or 2-methoxymethylene-testosterone for 2-methoxymethylene-17β-hydroxy-5α-androstane-3-one, there is obtained 2α-bromo-17β-hydroxy-androst-4-ene-3-one, $\tau_{CDCl_3}^{TMS}$ 9.22

(s., 18 Me.), 8.72 (s., 19 Me.), 6.34 (m., 17α-H) 5.18 (q., J=6, 14 cps., 2β-H) and 4.17 (s., 4-H).

EXAMPLE 6

2β-bromo-17β-hydroxy-5β-androstane-3-one

Following the procedure of Examples 1, 2, 3 or 4 but substituting 2 - hydroxymethylene-17β-hydroxy-5β-androstane-3-one for 2-hydroxymethylene-17β-hydroxy-5α-androstane-3-one or 2-methoxymethylene-17β-hydroxy-5β-androstane-3-one for 2-methoxymethylene-17β-hydroxy-5α-androstane-3-one, there is obtained 2β-bromo-17β-hydroxy-5β-androstane-3-one, $\tau_{CDCl_3}^{TMS}$ 9.24

(s., 18 me.), 6.33 (m., 17α-H) and 5.29 (q. J=5.5, 14 cps., 2α-H).

EXAMPLE 7

2β-bromo-17β-acetoxy-5β-androstane-3-one

A solution of 124 mg. of 2β-bromo-17β-hydroxy-5β-androstane-3-one in 1 ml. of acetic anhydride and 2 ml. of pyridine is warmed on a steam bath for two hours. The reaction mixture is treated with ice-water. The precipitate is collected by filtration to give 84 mg. of 2β-bromo-17β-acetoxy-5β-androstane-3-one, M.P. 165-167° (D.). Recrystallization from chloroform-isopropyl ether gives the analytical sample having M.P. 201.5-203° (D.), [α]$_D^{23}$ −26° (chf.); λ$^{KBr}$ 5.79 and 8.03μ;

$\tau_{CDCl_3}^{TMS}$ 9.19

(s., 18 me.), 8.94 (s., 19 me.), 7.96 (s., 17β-acetate), 5.43 (m., 17α-H) and 5.27 (q., J=5.5, 14 cps., 2α-H).

Analysis.—Calc'd for $C_{21}H_{31}O_3Br$ (411.40) (percent): C, 61.31; H, 7.60; Br, 19.43. Found (percent): C, 61.74; H, 7.79; Br, 19.47.

EXAMPLE 8

2β-bromo-5β-androstane-3,17-dione

A solution of 170 mg. of 2β-bromo-17β-hydroxy-5β-androstane-3-one in 5 ml. of acetone is treated with an excess of Jones reagent. Methanol is added to destroy excess reagent, and the inorganic salt removed by filtration. The filtrate is concentrated, diluted with water and extracted with chloroform. The chloroform extracts are washed with 8% salt solution, dried over sodium sulfate and evaporated to dryness. The residue is crystallized from ethyl acetate-isopropyl ether to give 62 mg. of 2β-bromo - 5β - androstane - 3,17-dione, M.P. 195.5–197.5° (D.). Recrystallization from ethyl acetate-isopropyl ether gives the analytical sample, M.P. 201–202° (D.), [α]$_D^{23}$+38° (chf); λKBr$_{5.79μ}$ $\tau_{CDCl_3}^{TMS}$ 9.11

(s., 18 me.), 8.92 (s., 19 me.) and 5.31 (q., J=5.3, 13.5 cps., 2α-H).

Analysis.—Calc'd for $C_{19}H_{27}O_2Br$ (367.35) (percent): C, 62.10; H, 7.41; Br, 21.75. Found (percent): C, 62.26; H, 7.66; Br, 21.95.

EXAMPLE 9

16β-bromo-androst-4-ene-3,17-dione

Following the procedures of Examples 1, 2, 3 or 4 but substituting 16 - hydroxymethylene - 3 - ethylenedioxy-androst - 5 - ene-17-one for 2-hydroxymethylene-17β-hydroxy - 5α-androstane-3-one or 16-methoxymethylene-3-ethylenedioxy-androst-5-ene-17-one for 2-methoxymethylene - 17β-hydroxy-5α-androstane-3-one there is obtained 16β - bromo-3-ethylene-dioxy-androst-5-ene-17-one which upon acid hydrolysis gives 16β-bromo-androst-4-ene-3,17-dione.

The invention may be variously otherwise embodied within the scope of the appended claims.

What is claimed is:

1. A process for preparing halo steroids comprising subjecting a steroid having the structure

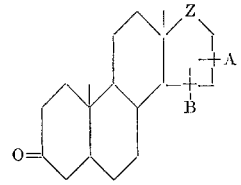

wherein A is hydroxymethylene, esters or ethers thereof; B is oxo; and A and B are on adjacent carbons on either the A or D rings and Z is selected from the group consisting of >C=O and H>COH to the action of *Caldariomyces fumago* in the presence of a halogen salt to form the corresponding halo steroid wherein A is replaced by halogen and recovering said halo steroid.

2. A process in accordance with claim 1 wherein the steroid is subjected under aerobic conditions to the action of a halogenating enzyme in the presence of hydrogen peroxide and a halide salt.

3. A process in accordance with claim 2 wherein the hydrogen peroxide is prepared in situ by the action of a peroxide producing enzyme system.

4. A process of claim 3 wherein the hydrogen peroxide producing enzyme system is glucose oxidase plus glucose.

References Cited

UNITED STATES PATENTS 3,102,080  8/1963  Raspe et al. _____ 195—51
3,365,467  1/1968  Diassi et al. _____ 195—51 X

OTHER REFERENCES

Beckwith et al., The Journal of Biological Chemistry, vol. 238, No. 9 (1963), pp. 3091–3094.

ALVIN E. TANENHOLTZ, Primary Examiner

UNITED STATES PATENT OFFICE
CERTIFICATE OF CORRECTION

Patent No. 3,520,779      Dated July 14, 1970

Inventor(s) Seymour D. Levine et al.

It is certified that error appears in the above-identified patent and that said Letters Patent are hereby corrected as shown below:

Column 1, line 52, "or" should read -- of --. Column 2, line 39, "2-hydroxymethylene-7$_\alpha$,17$_\alpha$-dimethyltestosterone" should be omitted; line 48, "tetrahydropyran" should read -- tetrahydropryan --; line 70, "it" should read -- It --.

Signed and sealed this 9th day of May 1972.

(SEAL)
Attest:

EDWARD M. FLETCHER, JR.           ROBERT GOTTSCHALK
Attesting Officer                 Commissioner of Patents